United States Patent [19]
Masters et al.

[11] Patent Number: 6,010,195
[45] Date of Patent: *Jan. 4, 2000

[54] AUTOMOTIVE MODULAR SEAT FRAME ASSEMBLY

[75] Inventors: James Masters, Farmington Hills; Andrew Massara, Southfield; Russell Davidson, Dearborn; Philip Leistra, III, Novi; Greg Allison, Keego Harbor, all of Mich.

[73] Assignee: Lear Corporation, Southfield, Mich.

[21] Appl. No.: 08/705,513

[22] Filed: Aug. 29, 1996

Related U.S. Application Data

[60] Provisional application No. 60/007,548, Nov. 27, 1995, and provisional application No. 60/016,775, May 7, 1996.

[51] Int. Cl.$^7$ ........................................................ B60N 2/12
[52] U.S. Cl. ................................ 297/452.55; 297/284.11; 297/452.2; 297/325
[58] Field of Search ............................... 297/232, 284.11, 297/325, 338, 344.1, 452.18, 452.2, 452.41, 452.55, 452.56; 248/393–395, 429, 430

[56] References Cited

U.S. PATENT DOCUMENTS

| | | |
|---|---|---|
| 1,237,956 | 8/1917 | Pue ........................................ 248/430 X |
| 2,647,791 | 8/1953 | Barenyi . |
| 3,669,498 | 6/1972 | Meyers et al. . |
| 3,727,977 | 4/1973 | Gmeiner ................................ 297/344.1 |
| 3,983,640 | 10/1976 | Cardullo et al. . |
| 4,509,796 | 4/1985 | Takagi ................................. 297/452.55 |
| 4,524,762 | 6/1985 | Schulman . |
| 4,526,421 | 7/1985 | Brennan et al. . |
| 4,585,273 | 4/1986 | Higgs et al. . |
| 4,601,517 | 7/1986 | Heesch . |
| 4,746,168 | 5/1988 | Bracesco ......................... 297/284.11 X |
| 4,973,105 | 11/1990 | Itou ................................. 297/452.38 X |
| 5,007,682 | 4/1991 | Kuwabara et al. ................. 297/452.38 |
| 5,301,914 | 4/1994 | Yoshida et al. . |
| 5,310,154 | 5/1994 | Ueda et al. . |
| 5,385,384 | 1/1995 | Gierman et al. . |
| 5,439,271 | 8/1995 | Ryan ................................ 297/452.2 X |
| 5,443,239 | 8/1995 | Laporte . |
| 5,464,273 | 11/1995 | Makoto . |
| 5,468,050 | 11/1995 | Hall et al. . |
| 5,472,165 | 12/1995 | Gruber . |
| 5,529,376 | 6/1996 | Jovan et al. ......................... 297/248 X |
| 5,547,259 | 8/1996 | Fredrick . |
| 5,575,533 | 11/1996 | Glance ................................ 297/452.2 |
| 5,607,204 | 3/1997 | Gryp .................................. 297/284.11 |

FOREIGN PATENT DOCUMENTS

| 205238 | 12/1982 | Japan ............................... 297/284.11 |

*Primary Examiner*—Peter R. Brown
*Attorney, Agent, or Firm*—MacMillan, Sobanski & Todd, LLC

[57] ABSTRACT

A front seat assembly (10), comprising first and second seats, is to be installed as a unit into a vehicle (12). A plurality of brackets (18) and (20) are attached to fixed rails (16) for attachment to the vehicle (12) and for interconnecting the fixed rails (16) of the two seats making up the front seat assembly (10). A slide rail (24) is supported by each of the fixed rails (16) for fore and aft movement relative to the fixed rails (16) and a pair of front (28) and rear (30) cross beams interconnect the slide rails (24) for supporting all of the remaining components of each seat. The rear cross beam (30) has an triangular cross section and a seat back (34) is supported on the rear cross beam (30) by flanges (32) having an triangular opening (36) complementary to and surrounding the rear cross beam (30). A support sheet (40) extends between and is supported by the cross beams (28) and (30) and a seat pan (42) is disposed above the support sheet (40) for supporting an occupant. A rear bladder (44) and a front bladder (46) are disposed between the sheet (40) and the pan (42) for raising and lowering the respective back and front of the pan (42) relative to the sheet (40) for adjusting the position of the seat. A stylized seat bottom trim (60) is supported on the pan (42) and a stylized back trim (62) is supported on the seat back frame (34). A center console (70) is supported on the frame members (20) between the first and second seat assemblies and a cover (68) is disposed over each of outside and laterally disposed pair of fixed (16) and slide (24) rails.

19 Claims, 5 Drawing Sheets

AUTOMOTIVE MODULAR SEAT FRAME ASSEMBLY

RELATED APPLICATION

This application claims priority to and all of the benefits of co-pending U.S. provisional patent application Ser. No. 60/007,548 which was filed on Nov. 27, 1995 and is entitled "Modular Vehicle Seat Assembly." This application also claims priority to and all of the benefits of co-pending U.S. provisional patent application Ser. No. 60/016,775 which was filed on May 7, 1996 and is entitled "Improved Modular Vehicle Seat Assembly".

TECHNICAL FIELD

The subject invention relates to automotive seat assemblies and, more specifically, to the front seat assembly.

BACKGROUND OF THE INVENTION

By way of background, vehicle front and rear seat assemblies typically include a right and left seat assembly having a seat bottom portion, a pivotal seat back, a seat track assembly and a center console or arm rest assembly positioned between the right and left seat assemblies. Typically, each of the components comprising the seat assemblies must be independently mounted in the vehicle, that is to the vehicle floor pan. More specifically, the seat bottom and seat back are mounted to a pair of seat tracks which must then be mounted to the vehicle floor pan for each individual seat assembly. Similarly, the center console is commonly secured between the seat assemblies and mounted to the vehicle floor pan. Other components of a vehicle seat assembly including seat adjustment means, seat belt restraint assemblies, rear hatch compartment panels, etc. must be individually mounted to the vehicle seat assembly and are often independently secured to the vehicle floor pan or vehicle side walls.

Additionally, the front seat assemblies for automobiles are designed for each model of automobile and are only usable in that model. The seat assembly for each model is fabricated from components specifically designed for that particular seat assembly and the seat assemblies for opposite sides of the vehicle frequently differ, sometimes requiring the two seats to be installed in the vehicle in separate procedures.

There are seat assemblies known in the prior art which include two seats as a unit, U.S. Pat. Nos. 4,526,421 to Brennan et al and 5,385,384 to Gierman et al; single seat assemblies which include components for rapid attachment to the vehicle body, U.S. Pat. No. 5,443,239 to Laporte; and a single seat assembly having minimal components, U.S. Pat. No. 5,468,050 to Hall et al.

However, there remains a need for an improved design which is fabricated of a minimum of components which are universally used in seats from model to model, yet retaining the flexibility to individually stylize the seats from model to model. Attendant to those design objectives is the requirement for a basic or universal seat frame assembly.

SUMMARY OF THE INVENTION AND ADVANTAGES

A seat frame assembly for a vehicle comprising a pair of fixed rails extending fore and aft and being laterally spaced from one another, with brackets attached to the fixed rails for attachment to a vehicle body, and a slide rail supported by each of the fixed rails for fore and aft movement relative to the fixed rails. A pair of front and rear cross beams interconnect the slide rails for supporting all of the remaining components of a seat supported totally on the cross beams.

Accordingly, the subject invention provides a seat frame with a minimum of components which may be utilized in seats for various different models of vehicles. In addition, the seat frame may be mounted to the door sills and the center of the vehicle body floor to strengthen the vehicle body structure.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
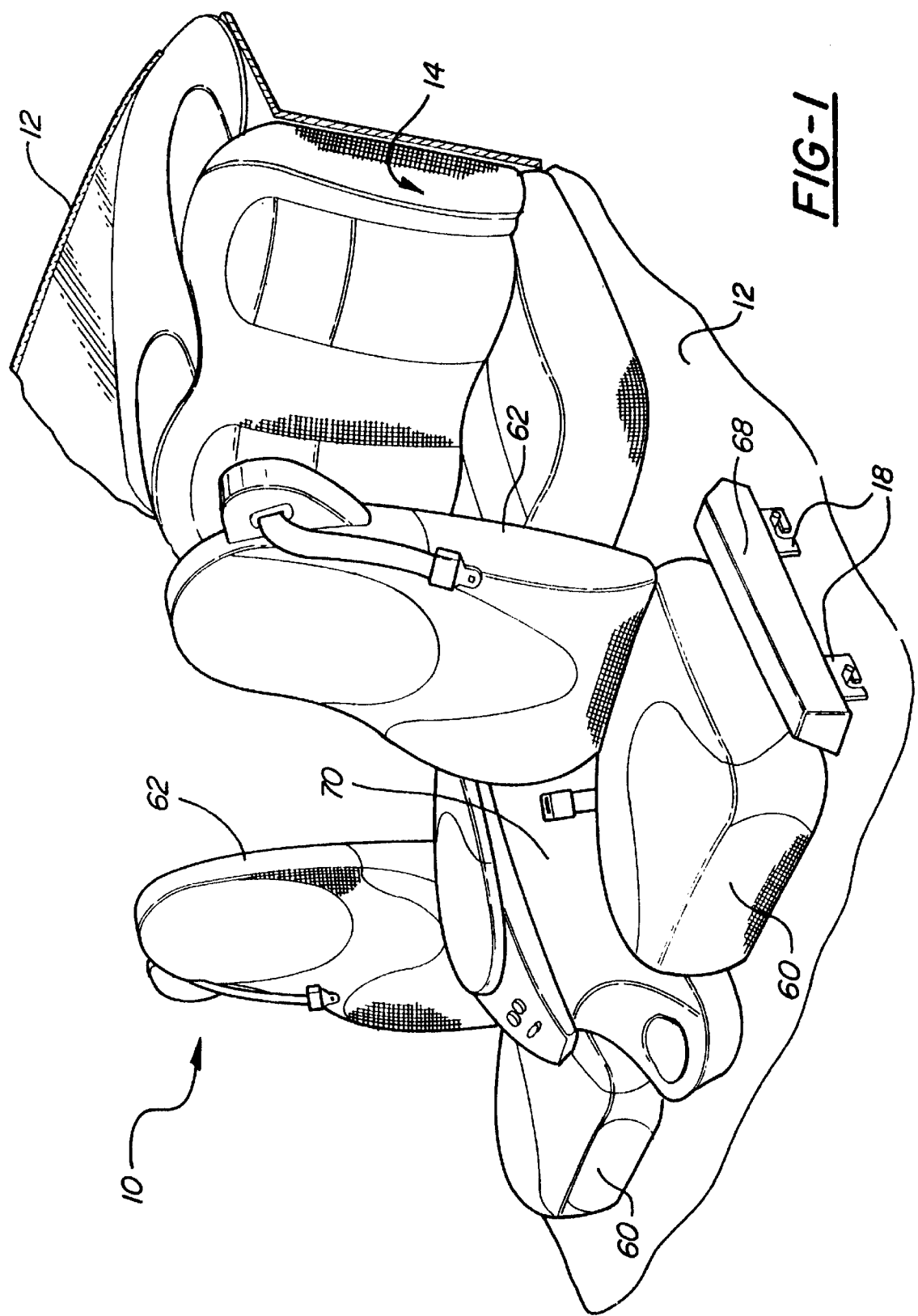
FIG. 1 is a perspective view of the interior of an automobile showing a rear seat assembly in combination with the front seat assembly of the subject invention.
Figure 2:
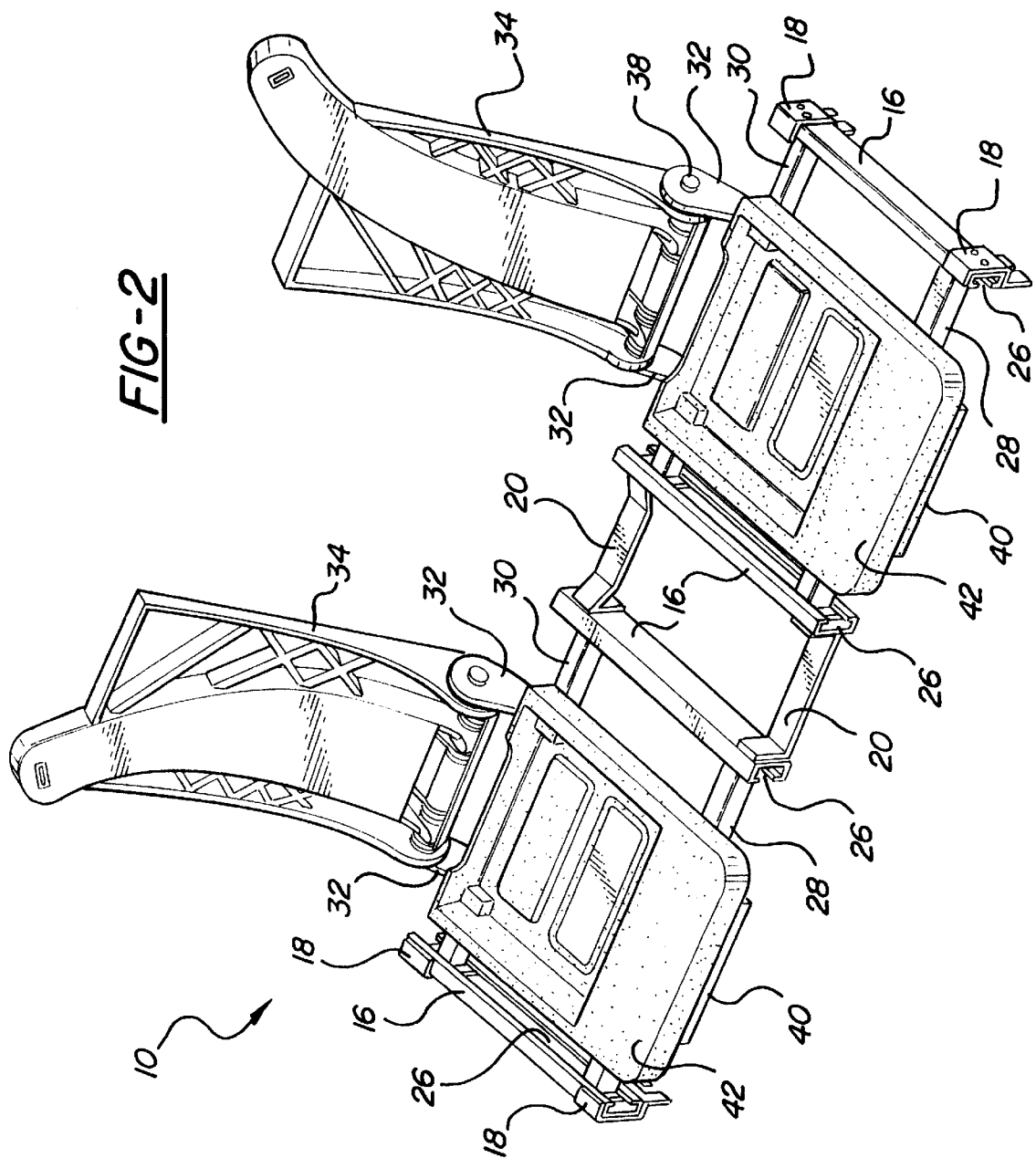
FIG. 2 is a perspective view of the support components of the front seat assembly of the subject invention.
Figure 3:
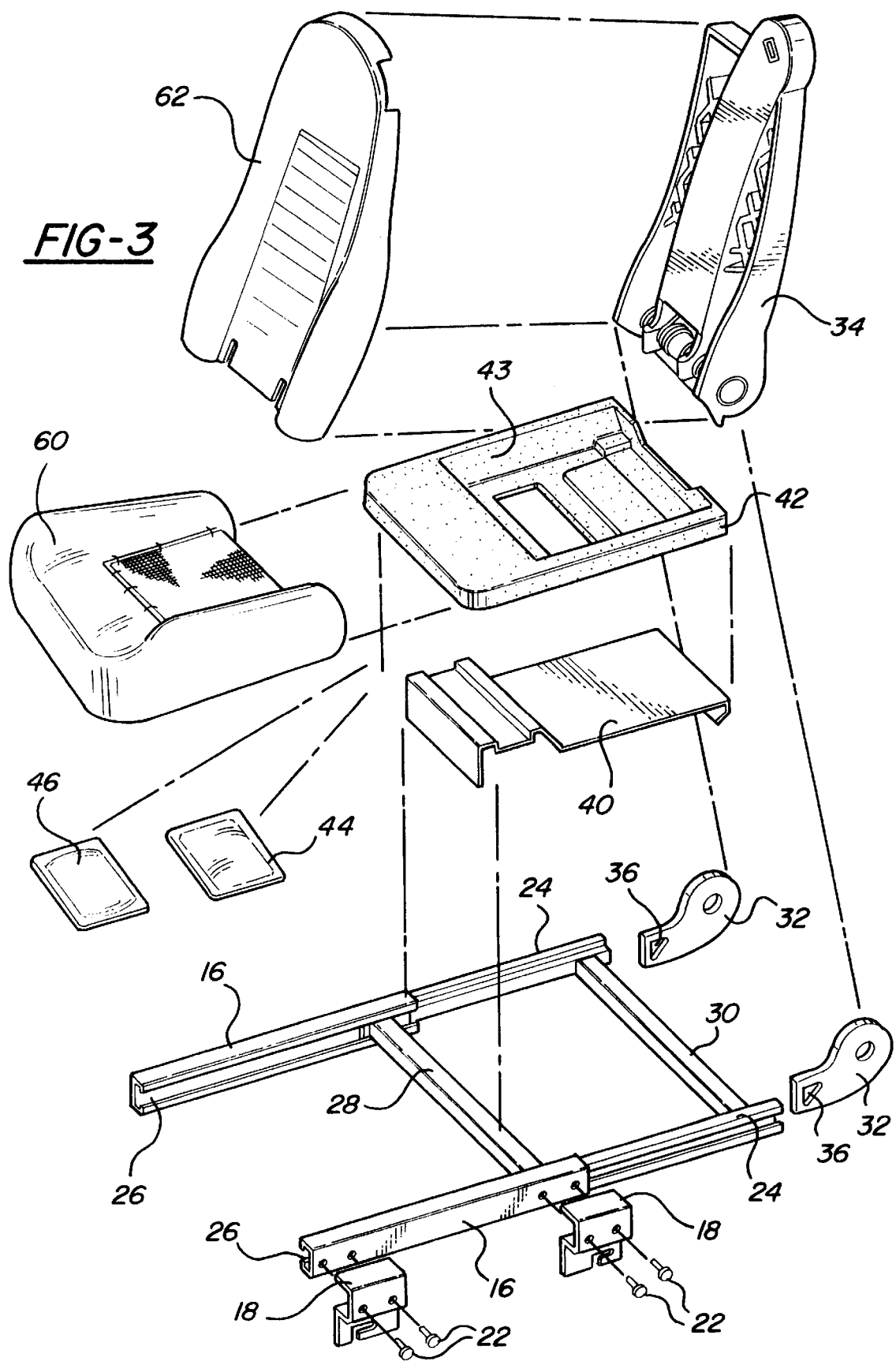
FIG. 3 is an exploded perspective view of one occupant seat of the front seat assembly of the subject invention.

Referring to the Figures, wherein like numerals indicate like or corresponding parts throughout the several views, a front seat assembly is generally shown at 10. The assembly 10 is to be installed as a unit in a vehicle 12 in front of a rear seat assembly 14.

The seat assembly 10 includes a pair of fixed rails 16 extending fore and aft and being laterally spaced across the vehicle 12 from one another. A plurality of brackets 18 and 20 are attached by rivets 22, or the equivalent, to the fixed rails 16 for attachment to the vehicle 12. Preferably, the brackets 18 include L-shaped slots which latch onto hooks 19 which extend from the vehicle 12. A slide rail 24 is supported by each of the fixed rails 16 for fore and aft movement relative to the fixed rails 16. One of the fixed 16 and slide 24 rails being C-shaped channels with the other of the fixed 16 and slide 24 rails being slidably disposed in the C-shaped channel. More specifically, the fixed rails 16 comprise the C-shaped channels having openings 26 which face one another and the slide rails 24 are slidably disposed in the C-shaped channels defining the fixed rails 16. Although not shown, roller or ball bearings may support the slide rails 24 in the fixed rails 16.

A pair of front 28 and rear 30 cross beams interconnect the slide rails 24 for supporting all of the remaining components of a first seat supported totally on the cross beams 28 and 30. The cross beams 28 and 30 extend through the openings 26 in the C-shaped channels defining the fixed rails 16 with the ends thereof attached to the slide rails 24, which are disposed inside the C-shaped channels.

Figure 4:
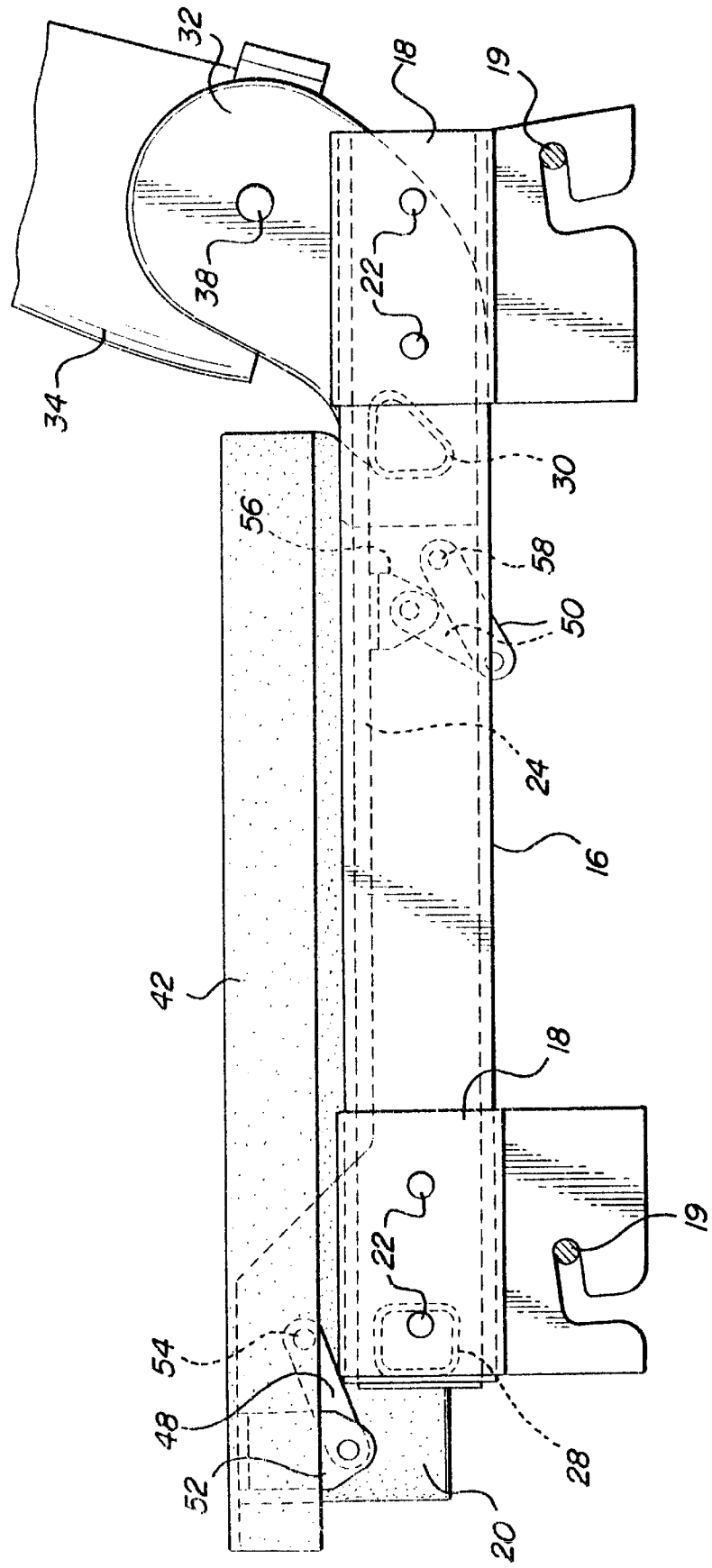
FIG. 4 is a fragmentary side view of the seat assembly of the subject invention.
Figure 5:
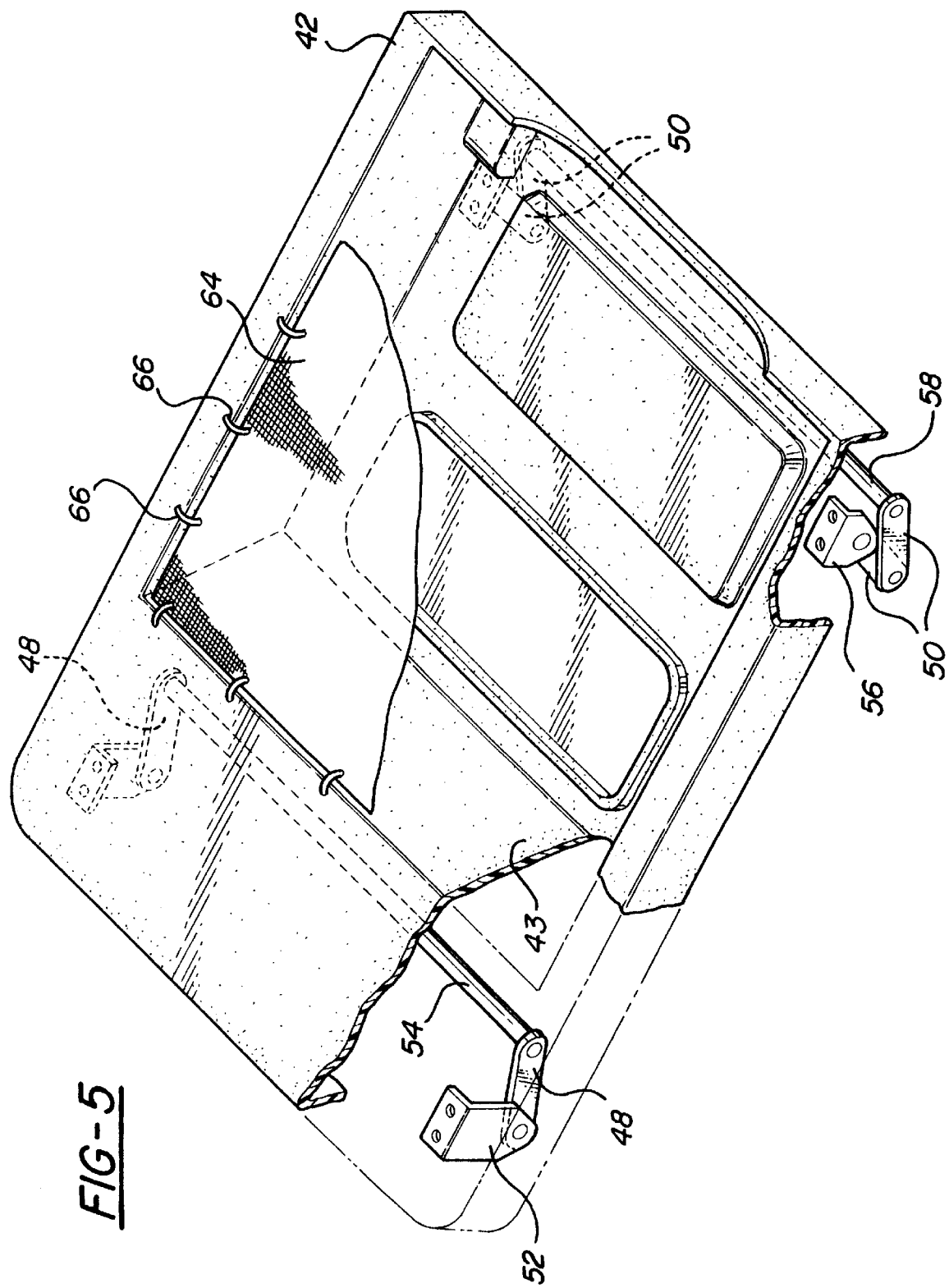
FIG. 5 is a perspective view, partially broken away and in cross section, of the occupant supporting component of the subject seat assembly.

A pair of seat back flanges 32 support a seat back 34. The rear cross beam 30 has an irregular cross section, i.e., triangular, as best shown in phantom lines in FIG. 4. The cross beams 28 and 30 are hollow tubes and provide torsional strength, particularly for the seat back flanges 32. Each of the seat back flanges 32 has an irregular or triangular opening 36 complementary to and surrounding the rear cross beam 30 for supporting the seat back 34 on the rear cross beam 30. Appropriate pivot pins 38 interconnect the seat back 34 and the flanges 32 for reclining movement of the seat back 34. The specifics of the seat back 34 form the subject matter of an independent invention disclosed and claimed in co-pending application Ser. No. 08/705,420 filed concurrently herewith and assigned to the assignee hereof.

A support sheet 40 extends between and is supported by the cross beams 28 and 30. The support sheet 40 may be attached to the cross beams 28 and 30 by fasteners or spot welding, or the equivalent. The support sheet 40 is cupped at the rear to extend around the rear cross beam 30 and has a platform at the front edge.

A seat pan 42 is disposed above the support sheet 40 for supporting an occupant over a recess 43. A rear bladder 44 and a front bladder 46 are disposed between the sheet 40 and the pan 42 for raising and lowering the respective back and front of the pan 42 relative to the sheet 40 for adjusting the position of the seat As will be appreciated, an appropriate pump and electrical drive motor with associated controls will be included in the seat assembly 10 to inflate and deflate the respective bladders 44 and 46.

A pair of front linkages 48 interconnect the pan 42 and the slide rails 24 for guiding the raising and lowering movement of the front of the pan 40. Two sets of rear linkages 50 interconnect the pan 42 and the slide rails 24 for guiding raising and lowering movement of the rear of the pan 42. More specifically, the pair of front linkages 48 are rotatablly connected to brackets 52 which are, in turn, secured to the pan 42 and are interconnected by a rod 54. The rod 54 is non-rotatably secured to the linkages 48 so that the linkages 48 rotate in unison to keep both sides of the seat at the same vertical height. The rod 54 is rotatablly support by and above the slide rails 24. In a similar fashion, one of the rear links of each pair 50 is connected to the pan 42 by a bracket 56 with the other link of each pair 50 secured to a rod 58, which is, in turn, rotatably supported by and between the slide rails 24 whereby the rear of the seat moves up and down in unison from side to side.

The front seat assembly 10 includes second pairs of fixed 16 and slide 24 rails and interconnecting cross beams 28 and 30 defining a second seat. The brackets 20 therefore include frame members 20 interconnecting the inside slide rails 24 of the first and second seat assemblies for defining the front seat assembly 10 which may be installed into the vehicle 12 as one unit. In other words, a robot could move the entire finished seat assembly 10 through the door opening in the vehicle 12 and precisely connect the brackets 18 to the hooks 19 and the frame members 20 to similar connecting devices.

In accordance with the component philosophy, a stylized seat bottom trim 60 is supported on the pan 42. In a similar fashion, a stylized back trim 62 is supported on the seat back 34. The trim components 60 and 62 are secured in place by appropriate quick fasteners (not shown), e.g., screws. Different trim components 60 and 62 may be utilized for different color vehicles and for different models of vehicles.

An occupant support means 64 is disposed in the recess 43 of the pan 42 for cushioning support of an occupant. More specifically, the occupant support means 64 comprises a flexible woven sheet suspended across the recess by rings 66 and provides a soft support for the occupant.

The outermost cooperating pairs of the fixed 16 and slide 24 rails are disposed laterally of or beside the bottom trim 60 and a cover 68 is disposed over the laterally disposed pair of fixed 16 and slide 24 rails. A center console 70 is supported on the frame members 20 between the first and second seat assemblies The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A seat frame assembly for a vehicle and comprising;
   a pair of fixed rails extending fore and aft and being laterally spaced from one another,
   brackets attached to said fixed rails for attachment to a vehicle body,
   a slide rail supported by each of said fixed rails for fore and aft movement relative to said fixed rails,
   a pair of front and rear cross beams interconnecting said slide rails for supporting all of the remaining components of a first seat supported totally on said cross beams,
   a support sheet extending between and supported by said cross beams, and
   a substantially rigid seat pan disposed above said support sheet for supporting an occupant of said first seat, wherein said seat pan is adapted to support a cushioned occupant support member thereon.

2. An assembly as set forth in claim 1 wherein said pan includes a recess and said occupant support means is disposed in said recess for cushioning support of the occupant.

3. An assembly as set forth in claim 2 wherein said occupant support means comprises a flexible sheet suspended across said recess.

4. An assembly as set forth in claim 3 including a stylized seat bottom trim supported on said pan.

5. An assembly as set forth in claim 4 wherein at least one pair of said fixed and slide rails are disposed laterally of said bottom trim.

6. An assembly as set forth in claim 5 including a cover disposed over said laterally disposed pair of fixed and slide rails.

7. An assembly as set forth in claim 1 including a rear bladder and a front bladder disposed between said sheet and said pan for raising and lowering the respective back and front of said pan relative to said sheet.

8. An assembly as set forth in claim 7 including front linkages interconnecting said pan and said slide rails for guiding raising and lowering movement of the front of said pan and rear linkages interconnecting said pan and said slide rails for guiding raising and lowering movement of the rear of said pan.

9. A seat frame assembly for a vehicle and comprising;
   a pair of fixed rails extending fore and aft and being laterally spaced from one another,
   brackets attached to said fixed rails for attachment to the vehicle,
   a slide rail supported by each of said fixed rails for fore and aft movement relative to said fixed rails,
   at least one cross beam interconnecting said slide rails,
   a support sheet extending supported by said cross beam,
   a seat pan disposed above said support sheet for supporting an occupant, and
   a rear bladder and a front bladder disposed between said sheet and said pan for raising and lowering the respective back and front of said pan relative to said sheet.

10. An assembly as set forth in claim 9 including front linkages interconnecting said pan and said slide rails for guiding raising and lowering movement of the front of said pan and rear linkages interconnecting said pan and said slide rails for guiding raising and lowering movement of the rear of said pan.

11. A seat frame assembly for a vehicle and comprising;
    a pair of fixed rails extending fore and aft and being laterally spaced from one another,
    brackets attached to said fixed rails for attachment to the vehicle, a slide rail supported by each of said fixed rails for fore and aft movement relative to said fixed rails, one of said fixed and slide rails being C-shaped channels with the other of said fixed and slide rails being slidably disposed in said C-shaped channel, a pair of front and rear cross beams interconnecting said slide rails for supporting all of the remaining components of a first seat supported totally on said cross beams, a pair of seat back flanges for supporting a seat back, said rear cross beam having an irregular cross section, each of said seat back flanges having an irregular opening complementary to and surrounding said cross beam for supporting a seat back on said rear cross beam, a support sheet extending between and supported by said cross beams, a seat pan disposed above said support sheet for supporting an occupant, a rear bladder and a front bladder disposed between said sheet and said pan for raising and lowering the respective back and front of said pan relative to said sheet, front linkages interconnecting said pan and said slide rails for guiding raising and lowering movement of the front of said pan, and rear linkages interconnecting said pan and said slide rails for guiding raising and lowering movement of the rear of said pan.

12. An assembly as set forth in claim 11 including second pairs of fixed and slide rails and interconnecting cross beams defining a second seat, said brackets including frame members interconnecting the inside slide rails of said first and second seat assemblies for defining a front seat assembly which may be installed into a vehicle as one unit.

13. An assembly as set forth in claim 12 including a center console supported on said frame members between said first and second seat assemblies.

14. A seat frame assembly for a vehicle comprising;

a pair of fixed rails extending fore and aft and being laterally spaced from one another, said fixed rails comprising C-shaped channels defining openings which face one another, brackets attached to said fixed rails for attachment to the vehicle, a slide rail supported by each of said fixed rails for fore and aft movement relative to said fixed rails, said slide rails being slideably disposed in said C-shaped channels, a pair of front and rear cross beams interconnecting said slide rails for supporting all of the remaining components of a first seat supported totally on said cross beams; and said cross beams extending through said openings in said C-shaped channels with the ends thereof attached to said slide rails.

15. A seat frame assembly for a vehicle comprising;

a pair of fixed rails extending fore and aft and being laterally spaced from one another, brackets attached to said fixed rails for attachment to the vehicle, a slide rail supported by each of said fixed rails for fore and aft movement relative to said fixed rails, a pair of front and rear cross beams interconnecting said slide rails for supporting all of the remaining components of a first seat supported totally on said cross beams;

said rear cross beam having an irregular cross section, at lease one seat back flange for supporting a seat back, said seat back flange having an irregular opening complementary to and surrounding said rear cross beam, and said seat back flange disposed entirely between said fixed and slide rails for supporting said seat back on said rear cross beam between said fixed and slide rails.

16. An assembly as set forth in claim 15 including a pair of said seat back flanges with said seat back supported between said flanges.

17. A seat frame assembly for a vehicle comprising;

a first pair of fixed rails extending fore and aft and being laterally spaced from one another, brackets attached to said first fixed rails for attachment to the vehicle, a first slide rail supported by each of said first fixed rails for fore and aft movement relative to said first fixed rails, a pair of first front and rear cross beams interconnecting said first slide rails for supporting all of the remaining components of a first seat supported totally on said first cross beams, a second pair of fixed rails extending fore and aft and being laterally spaced from one: another, brackets attached to said second fixed rails for attachment to the vehicle, a second slide rail supported by each of said second fixed rails for fore and aft movement relative to said second fixed rails, a pair of second front and rear cross beams interconnecting said second slide rails for supporting all of the remaining components of a second seat supported totally on said second cross beams, and said brackets including frame members interconnecting adjacent slide rails of said first and second seats for defining a front seat assembly which may be installed into a vehicle as one unit.

18. An assembly as set forth in claim 17 including a center console supported on said frame members between said first and second seat assemblies.

19. A seat frame assembly for a vehicle and comprising;

a pair of fixed rails extending fore and aft and being laterally spaced from one another, a slide rail supported by each of said fixed rails for fore and aft movement relative to said fixed rails, a pair of front and rear cross beams interconnecting said slide rails, a support sheet extending between and supported by said cross beams, and a substantially rigid seat pan disposed above said support sheet for supporting an occupant of said first seat, wherein said seat pan is adapted to support a cushioned occupant support member thereon.

* * * * *